G. R. Hay,
Making Wooden Trays,
N° 25,014. Patented Aug. 9, 1859.
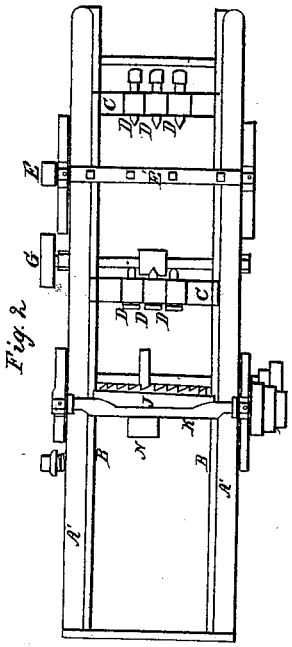
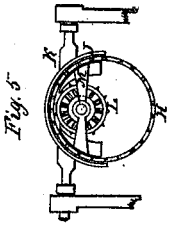
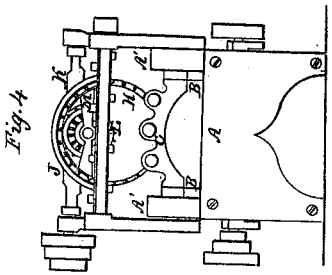
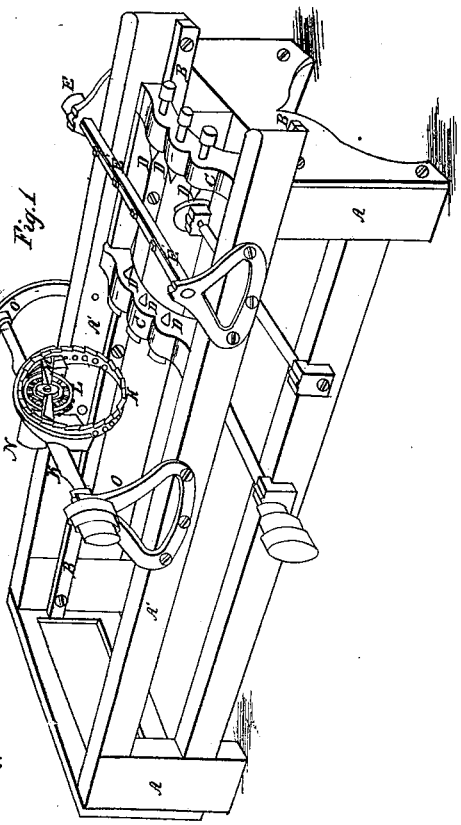
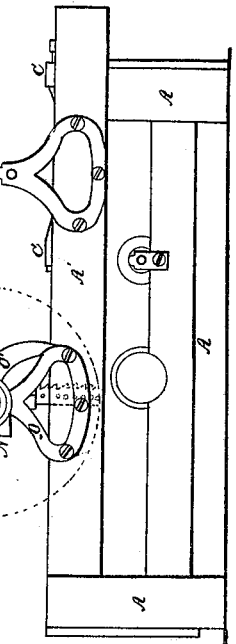

UNITED STATES PATENT OFFICE.

GEORGE R. HAY, OF BEREA, OHIO, ASSIGNOR TO HIMSELF AND R. PHELPS, OF SAME PLACE.

IMPROVED MACHINE FOR CUTTING OUT WOODEN WARE.

Specification forming part of Letters Patent No. 25,014, dated August 9, 1859.

*To all whom it may concern:*

Be it known that I, GEORGE R. HAY, of Berea, in the county of Cuyahoga and State of Ohio, have invented new and useful Improvements in Machinery for Making Wooden Trays and Bolts; and I do hereby declare that the following is a full and complete description of the construction of the same, reference being had to the accompanying drawings, making part of this specification, in which—

Figure 1 is a perspective view. Fig. 2 is a top view. Fig. 3 is a side elevation. Fig. 4 is an end view, and Fig. 5 is a sectional part.

Like letters refer to like parts in the several views.

A A' in the several figures represent the frame of the machine. This may be made of wood or iron, and should be about three feet wide and six or eight feet long. The ways B B are placed upon the inside of the pieces A', and upon these the carriage C traverses backward and forward. The end pieces of this carriage are furnished with spurs D, which hold the block in place from which the trays or bowls are made.

E represents the pulley of the cutter-shaft, and upon this shaft are placed the cutters E', the office of which is to level the top of the block from which the trays are cut. The cutter-shaft is driven by a belt from the pulley G, Fig. 2.

H in the several figures represents a circular or hoop saw. This is composed of one piece of steel plate, the ends of which are joined by welding, forming a hoop. The teeth are placed upon one edge, and around the whole circumference is drilled holes. (Seen at I, Fig. 1.) This hoop-saw is supported in a semicircular groove J, which is attached to the shaft K in such a manner that the center of the circle of the saw will be below a horizontal line drawn from point to point of the groove.

The saw is revolved by means of a pinion having short pointed teeth which fit into the holes I in the saw H. This pinion is supported by a cross-bar M, extending across the inner portion of the semicircular groove J. The pinion L is revolved by means of the pulley N upon the shaft of the pinion L.

Now as all these parts are attached to the shaft K it follows that if this shaft is rotated upon its axis the saw and pinion are rotated with it, and for the purpose of thus giving the saw this double motion—that is, rotating around its own center and changing from a horizontal to a vertical and onward in the same direction to a horizontal plane—it is thus attached to the shaft K, the pinion L being driven by a belt from a vertical shaft (not shown in the drawings) around the pulley N.

The shaft K is supported upon raised boxes O O', the box O' being composed of a single arm, curved in such a manner that the belt around the pulley N can have free play below or above the shaft, or at any intermediate point, so that the shaft K can be turned about three-fourths of a revolution without interfering with the action of the belt upon the pulley N.

In using this machine a block or log of wood is cut to the proper length and flattened upon the upper side and secured in the carriage C upon the spurs D. The cutter E' is then put in motion, by which the block is cut to an even surface as the carriage is moved forward. The center of the log being brought exactly under the shaft K (the saw being turned to the position shown by the dotted lines P in Fig. 3) the saw is put in motion by means of the pinion L, and the shaft K is slowly turned, so as to carry the saw in the direction of the arrow until it arrives at P', the saw at the same time cutting out the inside of a tray or bowl, as seen in Fig. 6. By elevating the carriage and block a sufficient distance for the thickness of the tray and repeating the operation a tray will be thus formed from the solid wood.

What I claim as my improvement, and desire to secure by Letters Patent, is—

The rock-shaft K, in combination with the hoop-saw H, constructed and arranged as described and operated by means of the pinion L, in the manner and for the purpose substantially as set forth.

GEO. R. HAY.

Witnesses:
W. H. BURRIDGE,
H. VOTH.